United States Patent

Wendsjö et al.

Patent Number: 6,045,951
Date of Patent: Apr. 4, 2000

[54] NON-AQUEOUS ELECTROLYTE SYSTEM FOR USE IN BATTERIES, CAPACITORS OR ELECTROCHROMIC DEVICES AND A METHOD FOR THE PREPARATION THEREOF

[75] Inventors: Åsa Wendsjö, Odense C; Marine Consigny; Steen Yde-Andersen, both of Odense S, all of Denmark

[73] Assignee: Danionics A/S, Odense S, Denmark

[21] Appl. No.: 08/860,034

[22] PCT Filed: Dec. 11, 1995

[86] PCT No.: PCT/DK95/00502

§ 371 Date: Sep. 19, 1997

§ 102(e) Date: Sep. 19, 1997

[87] PCT Pub. No.: WO96/18215

PCT Pub. Date: Jun. 13, 1996

[30] Foreign Application Priority Data

Dec. 9, 1994 [DK] Denmark ................. 1415/94

[51] Int. Cl.$^7$ ................................. H01M 10/40
[52] U.S. Cl. ................. 429/307; 429/314; 429/317; 429/330; 252/62.2
[58] Field of Search ................. 429/192, 197, 429/307, 314, 317, 330; 252/62.2

[56] References Cited

U.S. PATENT DOCUMENTS

| | | | |
|---|---|---|---|
| 4,737,424 | 4/1988 | Tobishima et al. | 429/197 |
| 5,037,713 | 8/1991 | Yoshino et al. | 429/192 |
| 5,192,629 | 3/1993 | Guyamard et al. | 429/197 |
| 5,240,790 | 8/1993 | Chua et al. | 429/190 |
| 5,326,657 | 7/1994 | Suga et al. | 429/192 |
| 5,352,547 | 10/1994 | Kita et al. | 429/194 |
| 5,478,673 | 12/1995 | Funatsu | 429/197 |
| 5,521,027 | 5/1996 | Okuno et al. | 429/197 X |

FOREIGN PATENT DOCUMENTS

| | | |
|---|---|---|
| 0 441 589 A1 | 8/1991 | European Pat. Off. . |
| 0 541 889 A1 | 5/1993 | European Pat. Off. . |
| 0 626 734 A2 | 11/1994 | European Pat. Off. . |
| 0 651 455 A1 | 5/1995 | European Pat. Off. . |
| 2-82457 | 3/1990 | Japan . |

*Primary Examiner*—Stephen Kalafut
*Attorney, Agent, or Firm*—Darby & Darby

[57] ABSTRACT

A new non-aqueous electrolyte system for use in batteries, capacitors and electrochromic displays, and consisting essentially of an alkali or ammonium salt, a solvent mixture, and optionally a polymer is disclosed. The new system is characterized in that the solvent mixture comprises a mixture of ethylene carbonate (EC) and -valerolactone (-VL), optionally containing one or more additional solvents selected from other organic carbonates, other lactones, esters and glymes, said system optionally being confined a separator. The electrolyte system can be applied in a broad voltage range, has a conductivity higher than $10^{-3}$ S/cm at room temperature, and shows a high stability against reduction. The improved stability towards reduction is mirrored in a cycling efficiency which is superior to the cycling efficiency of known non-aqueous electrolyte systems.

5 Claims, No Drawings

NON-AQUEOUS ELECTROLYTE SYSTEM FOR USE IN BATTERIES, CAPACITORS OR ELECTROCHROMIC DEVICES AND A METHOD FOR THE PREPARATION THEREOF

This invention is related to a non-aqueous electrolyte system for use in batteries, capacitors or electrochromic devices, said system essentially consisting of an alkali or ammonium salt, a solvent mixture and optionally a polymer.

Liquid, solid and immobilized non-aqueous electrolytes are of considerable interest for use in lithium batteries, supercapacitors and other electrochemical devices.

Recently, lithium secondary batteries have been developed based on lithium insertion materials for both the negative electrode and the positive electrode. Such electrochemical cells have a cell voltage in excess of 4V in the charged state and an energy density of more than 100 Wh/kg. Similarly for the recently developed supercapacitor cells, voltages higher than 3V give considerable improvement with respect to the energy storage capability. However, electrolyte compositions used in these devices are traditionally limiting the device performance because of low ionic conductivity and low electrochemical stability. The demands for electrolytes in batteries and supercapacitors have been sufficiently fulfilled only with few organic carbonates or in particular with mixtures thereof.

U.S. Pat. No. 5,192,629 of Bell Communication Research Inc. describes an electrolyte system comprising a solution of $LiPF_6$ in a mixture of dimethyl carbonate and ethylene carbonate.

EP 541 889 of Sanyo Electric Co. describes for lithium-ion graphite-based batteries the combination of a separator with a liquid electrolyte comprising one or more of the solvents ethylene carbonate, propylene carbonate, lactones and sulfolanes.

U.S. Pat. No. 5,240,790 of Alliant Techsystems Inc. describes the use of a polyacrylonitrile-based gelled polymer system, which includes as an immobilised liquid phase a ternary plasticifier mixture of ethylene carbonate, γ-butyrolactone and polyethylene glycol dimethyl ether, in lithium-based electrode batteries.

U.S. Pat. No. 5,326,657 of Nippon Oil Co. describes a polymeric solid ionic electrolyte having good mechanical properties. The polymeric solid electrolyte is a radiation crosslinked network based on a polyfunctional acrylate compound, containing a non-aqueous organic solvent and an alkali metal and/or an ammonium salt.

EP 651 455 of Matsushita Electrical Industrial Co Ltd. describes the use of a separator based on polyethylene and/or polypropylene to prevent lithium secondary batteries from shortcircuiting.

Although electrolyte systems showing high conductivity and which are stable against oxidation are known, there still exists a need for an electrolyte system which in addition to said high conductivity and high oxidation stability display a high stability against reduction.

Accordingly, it is an object of the invention to provide a non-aqueous electrolyte system for use in batteries, capacitors or electrochromic devices (including so-called "smart windows") which can be applied in a broad voltage range, which has a conductivity higher than $10^{-3}$ S/cm at room temperature, and which shows a high stability against reduction.

Now it has been found that this object is accomplished by an electrolyte system consisting essentially of an alkali or ammonium salt, a solvent mixture, and optionally a polymer, wherein said solvent mixture comprises a mixture of ethylene carbonate and γ-valerolactone, optionally containing one or more additional solvents selected from other organic carbonates, other lactones, esters and glymes, said system optionally being confined in a separator.

Whereas the pure γ-valerolactone is electrochemically stable against coke and graphite, the passivation layer formed upon reaction with the lithium containing negative electrode structures is poor, the lithium conductivity is poor, the reaction product is neither thermodynamically nor kinetically stable, and the cell balance is severely distorted as large amounts of active material is consumed in the passivation reaction.

In contrast, the ethylene carbonate displays good properties of the passivation layer formed, high conductivity, stability and low materials consumption. Pure ethylene carbonate, however, is solid at ambient temperature. Both of the materials γ-valerolactone and ethylene carbonate show good electrochemical stability vs. the cathode materials of lithium transition metal oxide type.

Surprisingly however, the mixture of γ-valerolactone and ethylene carbonate has been found to combine the preferred characteristics of the two individual components and furthermore results in high electrochemical stability against the negative electrode and formation a high performance passivation layer.

Moreover, the highly conductive electrolyte system of the invention allows operation of rechargeable lithium batteries with cell voltages above 4V and supercapacitors with cell voltages above 3V.

Compared to the mixture of γ-butyrolactone and ethylene-carbonate known from U.S. Pat. No. 5,240,790, the mixture of ethylene-carbonate and γ-valerolactone is a superior solvent mixture for high performance electrolyte applications, since said known and structurally close mixture displays poorer electrochemical stability against the negative electrode of the electrochemical system, although both mixtures shown an oxidation stability and conductivity which is non-restrictive for their application in the said electro-chemical systems.

The improved stability towards reduction is mirrored in the cycling efficiency of the ethylene carbonate/γ-valerolactone mixture, which is superior to the cycling efficiency of the ethylene carbonate/γ-butyrolactone mixture. In particular, a lower irreversible loss of active material is observed for the former mixture, the capacity of the electrochemical cell being sustained through a high number of cycles.

The ethylene carbonate and γ-valerolactone are preferably present in the solvent mixture in a relative molar ratio of from 20:80 to 80:20.

The solvent mixture is preferably composed of at least 90% of ethylene carbonate and γ-valerolactone.

In an even more preferred embodiment of the invention the solvent mixture of the electrolyte is composed essentially of ethylene carbonate and γ-valerolactone only.

In an alternative embodiment of the invention the solvent mixture comprises, in addition to ethylene carbonate and γ-valerolactone, one or more of the following solvents:

(a) alicyclic carbonates represented by the following general formula:

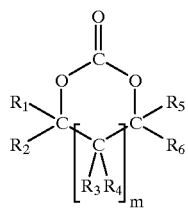

wherein each of $R_1$, $R_2$, $R_3$, $R_4$, $R_5$ and $R_6$ independently represent hydrogen or $C_1$–$C_2$ alkyl groups and m is an integer equal to 0 or 1, with the proviso that when m is equal to 0, at least one of $R_1$, $R_2$, $R_5$ and $R_6$ is different from hydrogen, preferably propylene carbonate;

(b) aliphatic carbonates represented by the general formula $R_7[OC(O)]_pOR_8$, wherein $R_7$ and $R_8$ independently represent $C_1$–$C_4$ alkyl groups, and p is an integer equal to 1 or 2, preferably dimethyl carbonate and/or diethyl carbonate;

(c) lactones in the form of cyclic esters represented by the general formula:

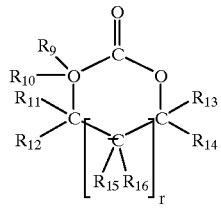

wherein each of $R_9$, $R_{10}$, $R_{11}$, $R_{12}$, $R_{13}$, $R_{14}$, $R_{15}$ and $R_{16}$ independently represent hydrogen or $C_{1-2}$ alkyl groups and r is an integer equal to 0 or 1, with the proviso that the value of r and the nature of the substituents are chosen so as to exclude γ-valerolactone from the definition, preferably γ-butyrolactone;

(d) esters represented by the formula $R_{17}[C(O)]OR_{18}$ $[OR_{19}]_t$, wherein each of $R_{17}$, $R_{18}$ and $R_{19}$ independently represent hydrogen or $C_1$–$C_2$ alkyl groups, and t is an integer from 0 to 2, preferably an acetate, more preferably (2-methoxyethyl)-acetate and/or ethyl acetate;

(e) glymes represented by the general formula $R_{20}O$ $(R_{21}O)_nR_{22}$, in which $R_{20}$ and $R_{22}$ independently represent $C_{1-2}$ alkyl groups, $R_{21}$ is —$(CR_{23}R_{24}CR_{25}R_{26})$— wherein $R_{23}$, $R_{24}$, $R_{25}$ and $R_{26}$ independently each represent hydrogen or $C_1$–$C_4$ alkyl groups, and n is an integer from 2 to 6, preferably 3, $R_{20}$ and $R_{22}$ preferably being methyl groups, $R_{23}$, $R_{24}$, $R_{25}$ and $R_{26}$ preferably being hydrogen or $C_1$–$C_2$ alkyl groups, more preferably hydrogen.

Any salt commonly employed as an ion-conductive salt in batteries or capacitors may be used in the electrolyte system according to the invention. Preferably however, the salt is an alkali salt or a quaternary ammonium salt of $ClO_4^-$, $CF_3SO_3^-$, $AsF_6^-$, $PF_6^-$ or $BF_4^-$, or any mixture of such alkali or ammonium salts, more preferably $LiAsF_6$, $LiPF_6$, $N(Et)_4$ $PF_6$ or $N(Bu)_4PF_6$ or any mixtures thereof.

In order to provide mechanical integrity of the electrolyte, the electrolyte system preferably comprises a crosslinked or non-crosslinked, advantageously non-crosslinked, polymer produced by UV or heat induced polymerisation of monomers or oligomers containing one or more polymerisable functional groups, said polymer more preferably being a non-crosslinkable polyester, polyurethane, polyether or polyacrylate.

The polymer is preferably produced by heat induced polymerisation at a temperature lower than 70° C., performed on an electrolyte precursor containing electrolyte salt, solvent mixture and the above-mentioned monomers or oligomers.

The electrolyte system according to the invention is preferably incorporated in a separator consisting of a porous structure made from a polymer, preferably polyethylene, polypropylene, polycarbonate or cellulose. The separator acts as a matrix which confines the physical dimensions of the electrolyte system, thereby enabling the production of thin, self-sustaining and uniform electrolyte membranes. The separator is preferably a woven or non-woven structure having a pore size in the range of 10×10 nm to 1×1 mm and a thickness of 10–100 μm, preferably 10–25 μm. More specifically, the size of the pores can be as in a microporous film (e.g. a Celgard separator) or up to 1×1 mm as in a woven net having a mesh of this size.

The alkali or ammonium salt is preferably present in a concentration from 0.01M to 2.5M, more preferably 0.1M to 1.5M, in the electrolyte system. The polymer is preferably present in an amount corresponding to from 3% to 95% by weight, preferably 5% to 70% by weight, more preferably 5% to 40% by weight, even more preferably 15% to 40% by weight, relative to the total weight of the electrolyte system.

The present invention is furthermore concerned with a simple and economically advantageuos method of the preparation of the electrolyte system of the invention, said method comprising mixing the solvents, dissolving the alkali or ammonium salts in the solvent mixture, optionnaly adding a thickening agent to the solution, and optionally adding monomers or oligomers containing one or more polymerisable functional groups, addition of a UV-photoinitiator or a heat-initiator, optionally incorporation of the obtained mixture in a separator and UV or heat curing of the monomers or oligomers.

In the following table I, some physical data of the ethylene carbonate and γ-valerolactone are listed.

TABLE I

| Compound | Type | Nominal formula | melting point (° C.) | boiling point (° C.) |
| --- | --- | --- | --- | --- |
| ethylene carbonate | alicyclic carbonate | $C_3H_4O_3$ | 38 | 243 |
| γ-valero-lactone | cyclic ester | $C_5H_8O_2$ | −31 | 207 |

In the following examples preparation of various embodiments of the non-aqueuos electrolyte system of the invention and the manufacture of variuos electrochemical devices containing the said electrolyte system is illustrated.

EXAMPLE I

A 1 M solution of $LiPF_6$ in ethylene carbonate/γ-valerolactone (1:1 by weight) was prepared by dissolving 13.5 g of $LiPF_6$ in a mixture of 50 g of ethylene carbonate and 50 g of γ-valerolactone. The conductivity was measured by ac impedance spectroscopy at 65 kHz in an experimental cell with stainless steel electrodes. The conductivity was 8.2 mS/cm at 25° C. The electrochemical stability range of the electrolyte was measured by cyclic voltametry at 200 mV/s in the range of 1–6 V vs. $Li/Li^+$, using a Pt-microelectrode having a radius of 5 μm. The oxidation potential was defined as the potential at which the current exceeded 3 mA/cm$^2$, and was found to be 4.7 V vs. $Li/Li^+$. The reduction behaviour was investigated applying the electrode in cells with Li-intercalating carbon-based negative electrode structures according to example III.

EXAMPLE II

To a 1M solution of $LiPF_6$ in a 1:1 mixture mixture of ethylene carbonate and γ-valerolactone was added 17.3% by weight of polyethylene glycol diacrylate (M.W:508) and 3% by weight of PEO (M.W: 600k). Subsequently, 3% by weight of polymerisation initiator (Darocure 1173) was added. The resulting UV-cured electrolyte had a conductivity of $2\times10^{-3}$ S/cm at 20° C.

EXAMPLE III

A rechargeable Li/carbon cell was prepared by laminating together a 25 μμm thick lithium foil with 100 μm of the electrolyte of example 1 and a 40 μm thick carbon electrode. The carbon electrode was prepared by pressing a mixture of petroleum coke and binder onto a copper foil. The reversible capacity of the resulting cell was 200 mAh/g, and the irreversible loss was 50 mAh/g. The resistance of the cell was constant for more than 100 cycles, 75% of the initial electrode capacity being available after 100 cycles.

COMPARATIVE EXAMPLE A

A rechargeable Li/carbon cell was prepared in the same manner as described in example III, except from using γ-butyrolactone in stead of γ-valerolactone. The reversible capacity of the resulting cell was 170 mAh/g, and the irreversible loss was 60 mAh/g. The resistance of the cell increased significantly during the first 10 cycles, 75% of the initial electrode capacity being available after 10 cycles.

EXAMPLE IV

A lithium ion cell having a graphite negative electrode, a lithium manganese oxide positive electrode and an electrolyte system consisting of 1M $LiPF_6$ in a mixture of ethylene carbonate and γ-valerolactone was prepared. The resulting cell showed full utilisation of the positive electrode capacity. The cell was cycled between 3.2V and 4.2V and displayed 85% of the original capacity after 40 cycles.

EXAMPLE V

A 1M solution of $N(Et)_4PF_6$ in ethylene carbonate/γ-valerolactone (1:1 by weight) was prepared by dissolving 27.5 g of $N(Et)_4PF_6$ in 50 g of ethylene carbonate and 50 g of γ-valerolactone. The conductivity was 12.4 mS/cm at 25° C. A capacitor was prepared from two carbon-based polymer-bound laminates, between which the electrolyte system was sandwiched. The resulting capacitor was cycled between 2.4V and 3.6V for more than 5000 cycles with a constant current of 1.0 $mA/cm^2$.

EXAMPLE VI

To a mixture of 4 g of ethylene carbonate and 3 g of γ-valerolactone was added 1.1 g of $LiCF_3SO_3$, 12.8 g of polyethylene glycol diacrylate (MW:508) and 4 g of 2-(2-ethoxyethoxy)ethyl acrylate. 1.6% of a photoinitiator (Darocure 1173) was incorporated in the mixture. This mixture was sandwiched between a $WO_3$ glass electrode and a counter glass electrode, applying an electrolyte thickness of 1 mm, and subsequently UV cured for 60 s. The resulting smart window was charged, say bleached, and discharged, say colored, for more than 1000 cycles.

We claim:
1. A non-aqueous electrolyte system for use in batteries, capacitors or electrochromic displays, said system consisting essentially of:
   an alkali metal or ammonium salt
   a solvent mixture, and
   a crosslinked or non-crosslinked polymer, produced by UV or heat induced polymerization of monomers or oligomers containing one or more polymerisable functional groups;
said solvent mixture comprising at least 50% by mole of a mixture of ethylene carbonate and γ-valerolactone, and optionally containing one or more additional solvents selected from the group consisting of other organic carbonates, other lactones, esters and glymes.

2. A non-aqueous electrolyte system for use in batteries, capacitors or electrochromic displays, said system consisting essentially of:
   an alkali metal or ammonium salt
   a solvent mixture, and
   a crosslinked or non-crosslinked polymer, in which the polymer is produced by heat induced polymerization of monomers or oligomers containing one or more polymerisable functional groups at a temperature lower than 70° C.:
said solvent mixture comprising at least 50% by mole of a mixture of ethylene carbonate and γ-valerolactone, and optionally containing one or more additional solvents selected from the group consisting of other organic carbonates, other lactones, esters and glymes.

3. A non-aqueous electrolyte system for use in batteries, capacitors or electrochromic displays, said system consisting essentially of:
   an alkali metal or ammonium salt
   a solvent mixture, and
   a polymer, selected from the group consisting of non-crosslinkable polyesters, polyurethanes, polyethers and polyacrylates produced, by UV or heat induced polymerization of monomers or oligomers containing one or more polymerisable functional groups;
said solvent mixture comprising at least 50% by mole of a mixture of ethylene carbonate and γ-valerolactone, and optionally containing one or more additional solvents selected from the group consisting of other organic carbonates, other lactones, esters and glymes.

4. A method for the preparation of a non-aqueous electrolyte system for use in batteries, capacitors or electrochromic displays comprising the steps of:
   a) mixing solvents to prepare a solvent mixture wherein the solvent mixture comprises a mixture of ethylene carbonate and γ-valerolactone, and optionally containing one or more additional solvents selected from the group consisting of other organic carbonates, other lactones, esters and glymes;
   b) dissolving alkali metal or ammonium salts in the solvent mixture; and
   c) adding polymer to said solvent mixture, wherein the polymer is formed in situ by the steps of
      1) adding monomers or oligomers containing one or more polymerisable functional groups;
      2) adding a UV-photoinitiator or a heat-initiator; and
      3) UV or heat curing the monomers or oligomers.

5. A method for the preparation of a non-aqueous electrolyte system consisting essentially of an alkali metal or ammonium salt, a solvent mixture, and optionally a polymer, said solvent mixture comprising at least 50% by mole of a mixture of ethylene carbonate and γ-valerolactone, and optionally containing one or more additional solvents selected from the group consisting of other organic carbonates, other lactones, esters and glymes, comprising the steps of:

(a) mixing the solvents to prepare a solvent mixture;

(b) dissolving the alkali metal or ammonium salts in the solvent mixture; and (c) optionally, forming said polymer in situ in said solvent mixture by the steps of:

(c1) adding monomers or oligomers containing one or more polymerisable functional groups;

(c2) adding a UV-photoinitiator or a heat-initiator; and (c3) UV or heat curing the monomers or oligomers.

* * * * *